United States Patent [19]

Hennessee et al.

[11] Patent Number: 5,653,386
[45] Date of Patent: Aug. 5, 1997

[54] SYSTEM FOR CONTROLLING CLIMATE WITHIN A VEHICLE

[75] Inventors: Robert P. Hennessee, Rochester Hills; Steven C. Huetteman, Canton; Ron M. Markowitz, West Bloomfield, all of Mich.

[73] Assignee: Chrysler Corporation, Auburn Hills, Mich.

[21] Appl. No.: 508,726

[22] Filed: Jul. 28, 1995

[51] Int. Cl.⁶ .................................. B60H 1/02; B60H 1/32
[52] U.S. Cl. .................. 237/12.3 B; 62/133; 454/75; 454/112
[58] Field of Search ............... 62/186, 133; 236/49.3; 165/43; 454/112, 75; 237/12.3 B

[56] References Cited

U.S. PATENT DOCUMENTS

| | | | |
|---|---|---|---|
| 3,403,855 | 10/1968 | Bouthers et al. | 237/2 A |
| 3,861,282 | 1/1975 | Scherenberg et al. | 162/133 X |
| 4,858,676 | 8/1989 | Bolfik et al. | 165/43 X |
| 4,914,924 | 4/1990 | Takahashi | 62/133 |
| 4,941,525 | 7/1990 | Ito et al. | 236/49.3 |
| 4,996,849 | 3/1991 | Burst et al. | 62/133 |
| 5,102,041 | 4/1992 | Fujiki et al. | 236/49.3 |
| 5,162,709 | 11/1992 | Ohi | 318/254 |

FOREIGN PATENT DOCUMENTS

| | | | |
|---|---|---|---|
| 0047312 | 4/1981 | Japan | 62/133 |
| 0038120 | 3/1984 | Japan | 62/133 |

*Primary Examiner*—Willkiam E. Wayner
*Attorney, Agent, or Firm*—Roland A. Fuller, III

[57] ABSTRACT

A system for vehicle climate control comprises a number of sensors probing the speed of the vehicle, the position of climate temperature unit and mode doors, the speed of the fan, ambient and interior temperature, and airflow setting. In a body controller, the probed data are correlated to look-up table values to keep the airflow volume constant and to decrease voltage applied to a fan motor when the speed of the vehicle increases. A method of practicing the climate control implemented in the system comprises a sequence of steps providing sensing a number of parameters, defining and storing in a controller memory a data characterizing relationship between the speed of the vehicle and the other parameters of the system, and correlating the sensed and stored data to maintain the airflow volume substantially constant.

13 Claims, 4 Drawing Sheets

SYSTEM FOR CONTROLLING CLIMATE WITHIN A VEHICLE

FIELD OF THE INVENTION

The present invention relates to an automotive climate control system, and more particularly to a system for introducing a constant flow rate of air into the passenger compartment regardless of vehicle speed and other variables.

BACKGROUND OF THE INVENTION

Numerous vehicle systems are known in the art for controlling the climate of the vehicle passenger compartment. In controlling the climate, it is crucial to control the rate at which air is introduced to the passenger compartment. However, many variables (e.g. vehicle speed) effect input air flow.

U.S. Pat. No. 3,403,855 discloses a system for damping an outside air intake port as a function of vehicle speed. A voltage proportional to the road speed of the vehicle is generated for controlling the opening and closing of an air shutter and thus regulating the ingress of air into the passenger compartment, as well as for controlling the operation of the motor fan.

U.S. Pat. No. 3,861,282 discloses a system for controlling fan motor speed as a function of vehicle speed and reducing the supply of fresh air into the interior space of the vehicle at slow driving speeds or during standstill thereof where large amounts of exhaust gases can pose safety risks.

U.S. Pat. No. 4,858,676 discloses a system where the fan speed is varied in response to the ram air intake at the front of the vehicle. Fan speed is controlled by varying the voltage supplied to the motor driving the fan.

U.S. Pat. No. 4,941,525 discloses a system where the fan speed is varied to maintain a desired temperature inside the vehicle and is also controlled by varying the voltage supplied to the fan motor.

U.S. Pat. No. 4,996,849 discloses a system for positioning a flapper in the fresh air duct.

U.S. Pat. No. 5,102,041 discloses a system in which an air flow is varied to maintain a constant temperature within the passenger compartment and the fan speed is controlled by varying the voltage fed to the fan motor.

U.S. Pat. No. 5,162,709 discloses a system using pulse width modulation to control the speed of a car's air conditioning fan motor. Speed of the motor is varied to eliminate an audible "beating" phenomenon associated with PWM controlled brushless fan motors.

Japanese Patent No. 60-78815 discloses a system in which electrical power fed to an climate control system blower is reduced upon the opening of the vehicles windows.

It is generally known that the air delivered out of the climate control system of a moving vehicle can be affected by the pressure that builds up at the passenger compartment air inlet. The movement of the vehicle relative to the air it passes through will cause this pressure to increase as speed increases. This pressure increase tends to increase the air delivery through the climate control system when a voltage applied to the fan motor is held constant. On the other hand, vehicle testing has found that vehicle speed itself cannot be relied on to correctly maintain constant air delivery for various fan speeds. The original selected fan speed and the selected climate control unit temperature and air distribution (sometimes referred to as mode) doors present variables which must also be considered in the calculation to maintain constant air delivery.

None of the systems disclosed in the above-mentioned references address the above-referenced problem in a satisfactory manner.

SUMMARY OF THE INVENTION

It is therefore the object of the present invention to provide a climate control system for vehicles incorporating advantages and free of disadvantages of the prior art systems.

Another object of the present invention is to provide a climate control system for vehicles capable of taking into consideration a plurality of factors, including the speed of the vehicle and airflow parameters of heat, ventilation and air conditioning (HVAC) unit temperature and mode door positions, which can affect stability of constant air delivery into the passengers compartment and have unfavorable effect on comfort, or physiological feeling of the passengers.

A further object of the present invention resides in providing a climate control system for vehicles capable to significantly lower the voltage which is fed to and increase the life of the device (such as an electric motor) that applies power to the fan.

Still another object of the present invention lies providing a climate control system for vehicles that improves automatic temperature control operation by virtue of more constant airflow volume, minimizing changes in heating or cooling performance.

The present invention can be understood in the context of a system capable of concurrently taking into account different factors affecting airflow volume entering the passenger compartment of the vehicle. According to the invention, there is provided a vehicle climate control system comprising a fan (blower) motor for moving air into a passenger compartment of the vehicle, an electric motor driving the fan, a power module operating the motor, a vehicle speed sensor, an airflow setting sensor, a climate control unit temperature sensor, air distribution door position sensors, and a controller comprising a memory unit. The sensors are connected to the controller and provide it with the respective data that are correlated with look-up tables stored in the memory unit of the controller. The controller is connected to the power module and generates an output signal to the power module which is indicative of desired airflow. The power module amplifies this signal and delivers it to the electric motor. The blower motor keeps the volume of airflow supplied to said passenger compartment relatively constant irrespective of vehicle speed and other perturbing factors.

The air distribution door position sensors include a mode door position sensor and a temperature door sensor. There may also be a recirculation door sensor, or the system may interpret position of the recirculation door by noting direction of last actuation.

The present invention is also expressed as a method practiced in a vehicle climate control system for maintaining a preselected regime of the system having an inlet duct for taking ambient air in, a means for temperature affecting the ambient air, means for distributing the ambient air into a passenger compartment of the vehicle by virtue of a fan driven by a motor, and a means controlling the regime and affecting a voltage applied to the motor. The method comprises the steps of sensing data characterizing the speed of the vehicle; sensing data characterizing a selected level of air delivery into the passenger compartment; sensing data characterizing status of the temperature affecting means and the distributing means; defining and storing in the controlling means data characterizing relationship between the speed of the vehicle and a speed of the fan; defining and storing in the controlling means data characterizing the extent to which the speed of the fan is affected by the status of the distributing means; defining and storing in the controlling means data characterizing the extent to which the speed of the fan is affected by an amount of wanted air delivery into the passenger compartment; and correlating the sensed data to the stored data to generate a signal maintaining substantially constant airflow volume supplied to the passenger compartment and decreasing the voltage when the speed of the vehicle increases.

It is also an advantage of the present climate control system for vehicles that lowering the fan motor voltage lowers the fan motor and fan noise. The result will provide the occupants with nearly constant air delivery with very low noise level at highway speeds. Lowering the voltage increases the life of the fan motor. More constant airflow volume enables the system to keep to a minimum changes in heating or cooling performance.

For a better understanding of the invention, together with the above and other objects, features and advantages thereof by those versed in the art, reference is made to the following detailed description and the accompanying sheets of drawings in which preferred structural embodiment incorporating the principles of the present invention is shown by way of illustrative example.

DETAILED DESCRIPTION OF THE PREFERRED EMBODIMENTS

The general construction of a system for vehicle climate control according to the present invention will be described below with reference to FIGS. 1 and 2.

Figure 1:
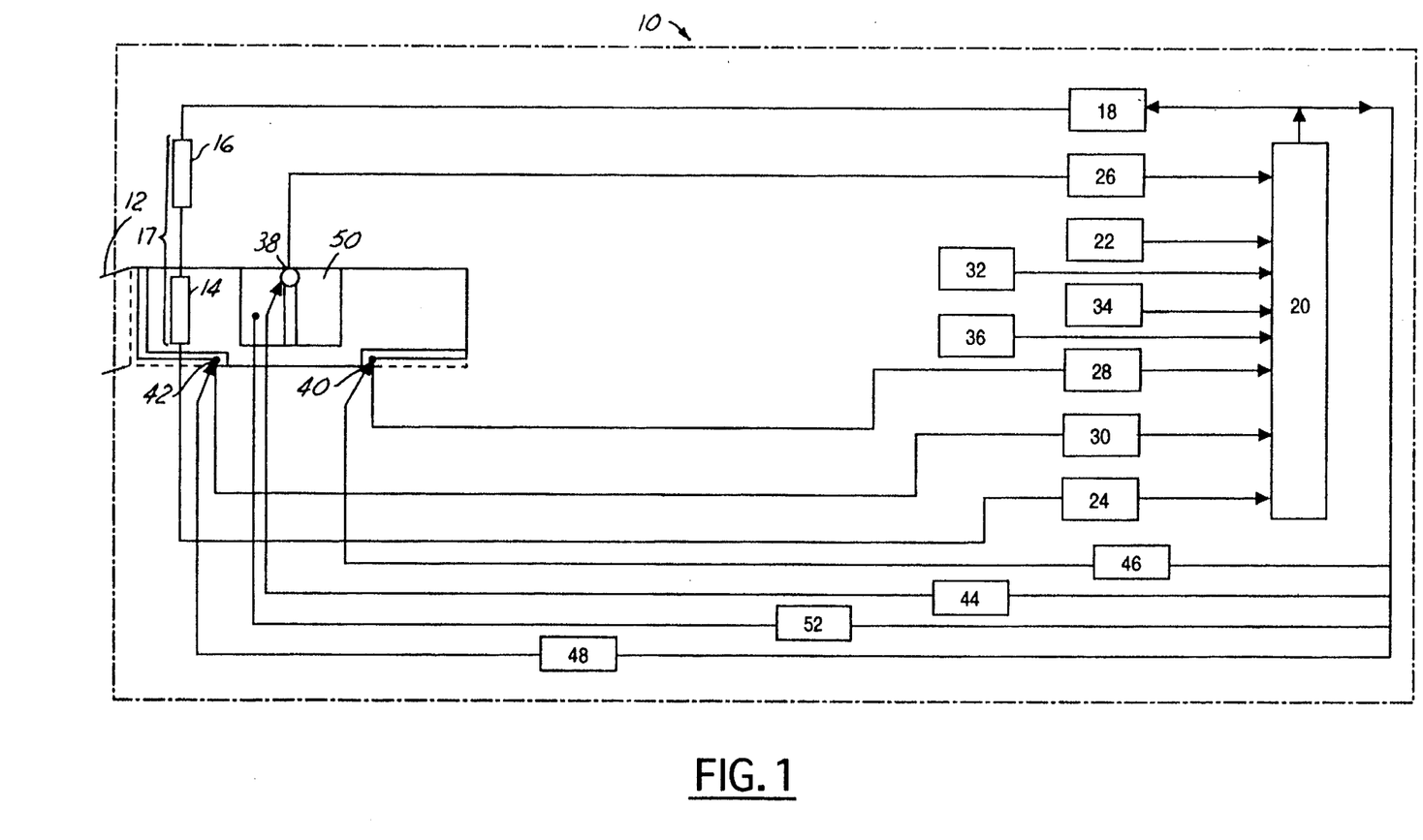
FIG. 1 is a schematic representation of a vehicle climate control system according to the present invention.
Figure 2:
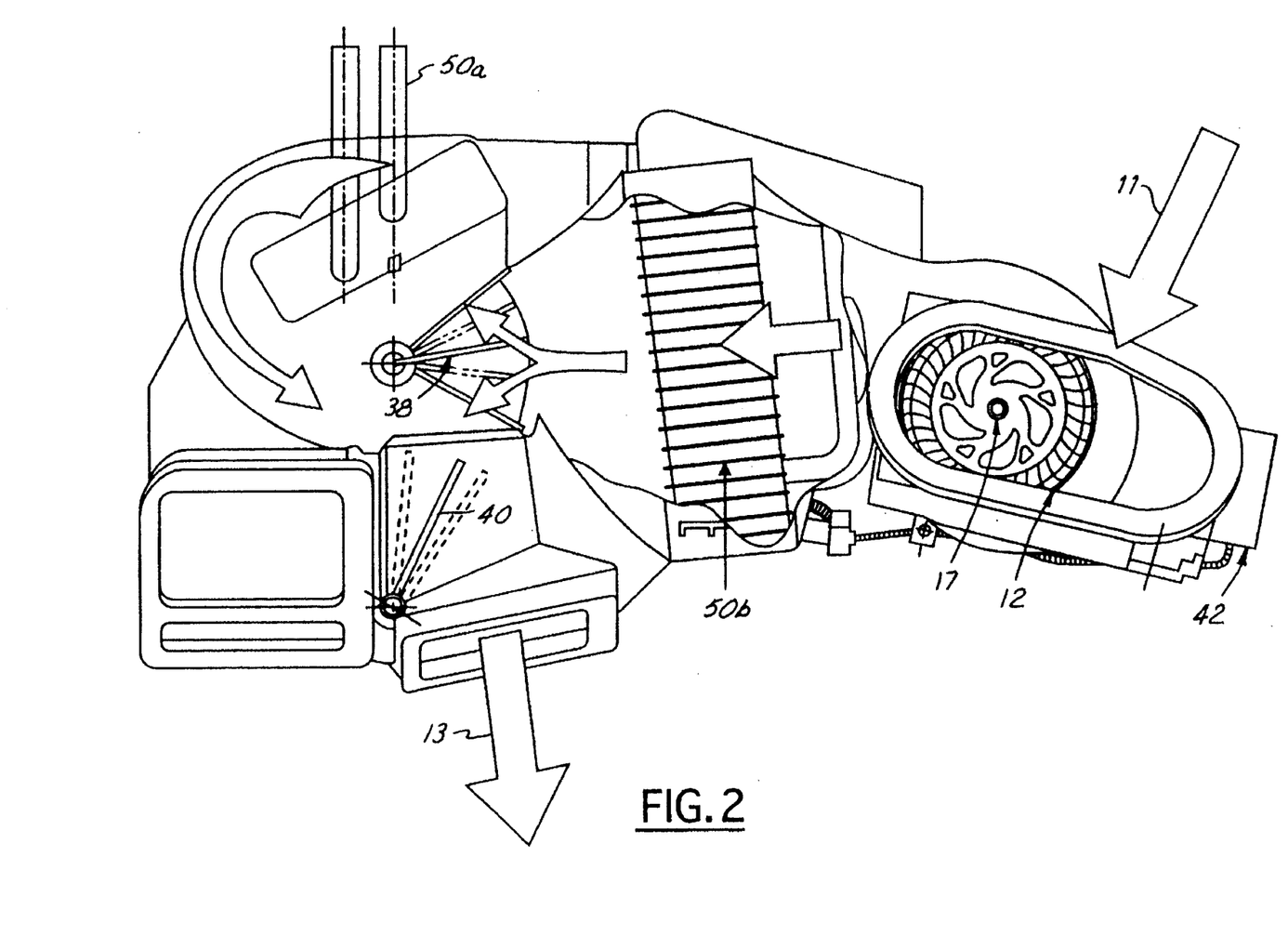
FIG. 2 is a perspective schematic representation of the main components of the vehicle climate control system according to the present invention.

A vehicle climate control system 10 represented schematically in FIGS. 1 and 2 generally has an outside air inlet 11 for conducting ambient air into the system by means of an inlet duct 12. Air passing through the system is put under climate control (heating or cooling the air) and distributed to the interior of the vehicle (not shown) through climate control unit air outlets (extensively shown as a vent 13) and a ductwork (not shown in Figures). With this in view, air is drawn into the inlet duct 12 and pushed through the balance of the climate control system by means of a fan 14 driven by a fan motor 16 (the fan 14 and the fan motor 16 are collectively referred to as a blower system 17). The speed of the fan motor 16 is controlled by means of a power module 18 in response to commands from a controller 20. For the case under consideration, the controller 20 is actually the body controller in the vehicle which also controls other unrelated tasks. Those versed in the art will recognize, in view of this disclosure, that the controller 20 and its peripheral equipment could be structured according to different architectures. In a preferred embodiment, however, the controller 20 is configured. including at least the following blocks not shown in FIG. 1: a central processing unit, a read-only memory, a random access memory, and an input-output port. Controller programs are read for each command from the read-only memory which stores preset control programs. Unit commands are executed by the central processing unit. The random access memory temporarily holds data while they are being processed. Through the input-output port, controller input-output circuits exchange data with external devices.

The controller 20 shown in FIG. 1 preferably receives speed data over a bus (not shown) or, alternatively, coupled to the car's engine controller (not shown), an input signal from a vehicle speed sensor 22, a climate control unit temperature door sensor 26, a mode door sensor 28, a recirculation door sensor 30, an ambient temperature sensor 32, an interior temperature sensor 34, and an air flow setting sensor 36 (the air flow setting sensor is present within a driver control panel and is operated by the driver of the vehicle). (The ambient and in-car temperature sensors may be used, but are not required for airflow control.)

The controller 20 produces output signals from calculations based on the correlation of the data stored in the controller read-only memory in response to the detected signals. received from the sensors. The controller generates signals controlling a climate control unit temperature door 38, a mode door 40, and a recirculation door 42 through actuators 44, 46 and 48, respectively, a heater/chiller 50 via an actuator 52, and the power module 18. The heater/chiller 50 is shown in FIG. 2 as the heater 50a and the chiller 50b. Those skilled in the art will appreciate that the heater/chiller 50 could comprise any conventional type of a heater and a cooler suggested by this disclosure, for example any conventional type of a heater such as an electric resistance heater, and any conventional type of a cooler (an evaporator) such as a magnetic flux cooling device.

The climate control unit door 38 can be placed in one of its two extreme positions or in any one of a variety of intermediate positions. Extreme positions of the door 38 are used where it is desirable to have either all or none of the air passing through the system to be allowed to pass through the block 50 and to be heated (or chilled). The intermediate positions may be used for governing the temperature of air being discharged from the system according to the present invention.

The recirculation door 42, which is operated by the controller 20 by means of the actuator 48, allows the climate control system to utilize either outside air or inside air. The solid line in FIG. 1 depicting the door 42 and FIG. 2 show the door in the outside air mode where the access to the system is open for the air outside the vehicle through the inlet duct 12. The climate control according to the present invention is intended principally for use when the system is operating with air drawn from outside the vehicle, as distinguished from recirculated air.

The controller 20 operates the mode door 40 (by way of the actuator 46) to shift the flow through the climate control system to various areas within the vehicle such as defogging, or floor modes. Those versed in the art will be fully aware, in view of this disclosure, of any of the known means for operating various flow control doors that can be used in the various embodiments of this invention. For example, vacuum motor and stepper motor driven linkage mechanisms, or other motor designs or flow control door designs could be used with the present invention. In a like manner, those skilled in the art will appreciate, in consideration of this disclosure, that various conventional types of fans with different aerodynamic elements such as axial flow devices could be employed.

Figure 3:
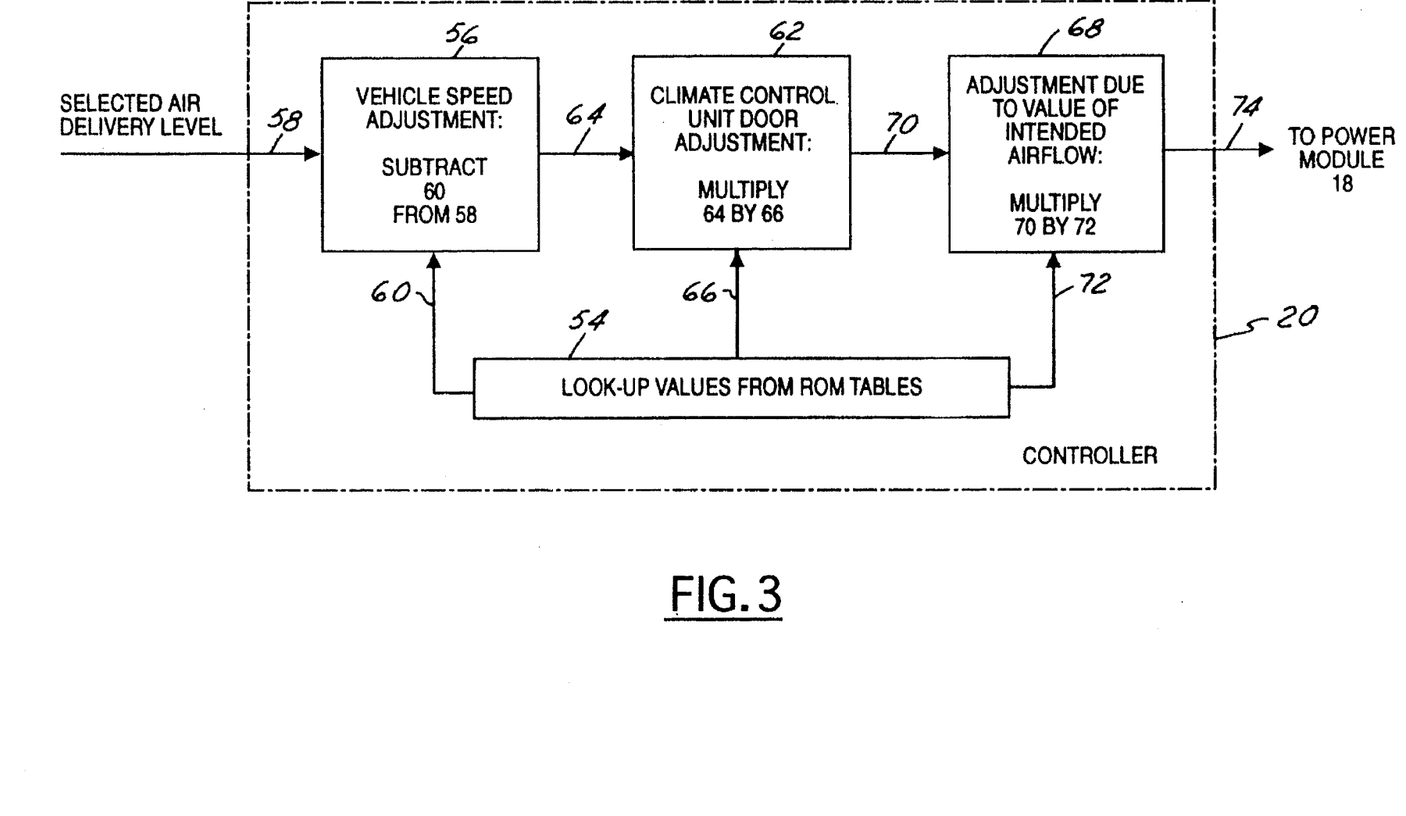
FIG. 3 is a block diagram illustrating the decision making process employed by the system of the present invention.

Referring now to FIG. 3, a block diagram illustrating a decision making process in the system according to the present invention shows stages of deriving a resulting signal value for controlling the speed of the fan motor 16.

The calculations discussed below assume that there is a relationship between a vehicle speed, which pressurizes the air inlet 11 and forces more air into the passenger compartment, and a given voltage applied to the fan motor 16. It is also assumed that this relationship is most pronounced when the airflow path through the unit is the least restrictive, and it is less pronounced when the fan 14 is moving a high speed that develops a high flow rate which will tend to pressurize the interior of the car thereby lowering the pressure drop across the climate control unit that allows the ram air effect. It can be demonstrated that the volume flow rate out of the ductwork can be made more constant by reducing the fan motor voltage to offset the air delivery caused as the vehicle speed increases.

There is also one more factor known as the wind which can change the air speed relative to the vehicle. It is assumed that typical vehicle speeds of 25–65 mph are higher than typical winds. This means that it is reasonable to develop a simple set of equations that could be used in the computer 20 to relate all effects except the wind. It can provide a significant improvement in flow regulation and fan motor noise and life. Also, it suggests that more complicated formulas or additional sensors to detect the wind relative to the vehicle are not needed to provide the customer with notable improvements in climate control performance. A reasonable level of flow control would be possible assuming that there is one main relationship that determines how the fan motor voltage is to be decreased for increases in vehicle speed. Changes in climate control unit door position only lessen the extent to which this relationship is pronounced. The same is applicable to increasing the fan motor selected speed.

Now, the read-only memory of the controller 20 stores, preferably in the form of tables, look-up value information 54 disclosed illustratively below in Tables 1, 2, 3 and 4. The decision making process in the system according to the present invention comprises several steps to derive a resulting signal value for controlling speed of the fan motor 16.

A vehicle speed adjustment step is represented schematically as a box 56. An input signal 58 conveys information regarding a selected air delivery level. This signal is originated by the driver who sets the level. Data from a look-up table setting relationship between a given vehicle speed and a fan speed signal % decrease factor is a signal 60. Vehicle speed is estimated, for example, in miles per hour whereas the fan decrease (compensation) factor is given as a percentage scaled from 0% defining no change to 100% characterizing the maximum change to a fan motor speed signal. There is a linear relationship between this percentage and the voltage applied to the fan motor 16, with 0% corresponding to 0 volts and 100% corresponding to the full vehicle voltage which is typically 12.0 volts.

In Table 1, values for the relationship between the vehicle speed and the fan speed signal decrease factor are determined by setting the fan speed selection at 30% and varying the vehicle speed when the climate control unit temperature and the air distribution doors are set for minimum airflow restriction. For example, in the Chrysler LH application these door positions are full cold and 100% outside air.

To define the relationship between vehicle speed and fan motor voltage lowering used as the basis for Table 1, the following exemplary procedure can be used.

A. The fan 14 is set to lowest speed. The lowest fan speed is selected with regard to the following factors:

A1. Too low fan speed will not allow the air to adequately circulate in the vehicle to blend air temperature layers and prevent establishing hot and cold temperature zones;

A2. Too low fan speed without air pressure to sustain a certain electric motor shaft speed can reduce the life of the motor;

A3. Too high fan speed can subjectively be too noisy to the driver.

B. The climate control unit doors are set to the least restrictive airflow path position. Typically, the lowest air restriction setting of an automotive unit is when the air is in the full cold position with flow directed to the panels. It can vary with different units and ductwork. It is the door position setting with the highest airflow volume that defines the least restrictive path.

C. The voltage applied to the fan motor 16 is measured.

D. The airflow volume out of the climate control unit is measured, with the outside wind speed less than 5 mph and the vehicle not moving.

E. The vehicle speed is increased to 10 mph, the airflow volume out of the climate control unit is measured again, and the voltage to the fan motor is decreased until the airflow volume returns to the level measured with the vehicle standing still.

F. The vehicle speed is successively increased by 10 mph with the above step E airflow volume measuring and the voltage decreasing for each such increase, until the voltage applied to the motor is 0 volts.

G. The look-up table defines the required decrease in fan motor voltage as vehicle speed increase to maintain a set airflow volume delivery in ft/min for conditions which make this effect most pronounced. It should be appreciated that the table value "Decrease in fan speed signal, %" is different from the intended fan speed in % which is the total setting. The decrease in fan speed signal can be thought of as a change in voltage to the fan motor or the change of 1%= (12.0–0 volts)/(100–0%)=0.12 volts. If the initial (0 mph) fan voltage was 4.5 volts and the voltage at 30 mph was 2.1 volts, then the % difference would be 4.5–2.1=2.4 volts or 2.4/0.12=20%. The reduction in fan motor voltage for 30 mph would be 20% as shown in Table 1.

TABLE 1

| Vehicle speed, mph | 0 10 20 30 40 50 60 |
|---|---|
| Decrease in fan speed signal, %, for 30% intended fan speed at the least airflow restriction | 0 2 10 20 50 80 80 |

An airflow signal 58 is preferably also expressed in % and, selected through the driver's operation, has 0% assigned to off position and 100% assigned to full speed.

The result of the vehicle speed adjustment step 56, that is a difference from subtracting a signal 60 value from a signal 58 value, is directed as a signal 64 to undergo a climate control unit temperature door adjustment step schematically shown as a box 62. In the course of the adjustment 62 step, the vehicle speed adjustment resulting signal 64 is further adjusted by a look-up table data summarized in Table 2 and directed to the box 62 as a signal 66. The values shown below in Table 2 are determined by a changing climate control unit temperature door position for the highest selected fan speed while the vehicle is not moving. In this case, the door position value of 0% corresponds to full cold panel setting, whereas the value of 100% corresponds to full heat, defroster setting.

To establish the effect which the temperature door positions exert on fan motor voltage and which is put as the basis for Table 2, the following exemplary procedure can be used, with the starting position thereof corresponding to that defined as the step D for the purposes of Table 1.

H. The vehicle speed is increased to 30 mph (half of most typical speed of 60 mph to optimize scaling for most vehicle speeds of 0–60 mph). The total airflow is measured with the Table 1 correction applying the compensation.

J. The temperature door is moved to full heat condition (typically highest airflow restriction). This would be considered the 100% heat position. (A door position moved through half this angle would be considered the 50% position, proportionally.)

K. The airflow level will decrease. The voltage is to be increased to the point that produces the airflow volume measured in the above step H. Now, the new decrease in fan speed % can be calculated following the same procedure as that for the purposes of Table 1. If the new voltage level is 0.336 volt, then the % would be 2.33/(12.0–0 volts)=0.028= 2.8%.

L. The ratio of how this effect is diminished is determined by taking the original difference signal % (or voltage) change obtained in step H and dividing it by the value obtained in step K. For example, taking the 2.8% value determined in step K and the decrease in fan level signal of 20% for 30 mph found in Table 1 forms the ratio 2.8/20= 14%. The ratio can also be calculated by taking the voltage changes of 0.336 volt (see step K)/2.4 volts (see step G)=0.14=14%. This point would be 14% for the full 100% temperature door position.

M. Then, steps A–D, H–L are repeated for various intermediate temperature door positions, preferably spaced equidistantly from each other.

Returning to FIG. 3, this adjustment is reflected in the box 62 step where the value of the signal 64 is multiplied by the value of the signal 66 obtained from a following Table 2 summarizing the steps A–D, H–M described heretofore.

TABLE 2

| Temperature door position, % | Function | Multiplier value, % |
| --- | --- | --- |
| 0 | Full Cold | 100 |
| 25 | | 78.5 |
| 50 | Half Rotation Position | 57 |
| 75 | | 28 |
| 100 | Full Heat | 14 |

One more step in processing information is an adjustment due to value of intended airflow which step is symbolically shown in the form of a box 68. It will be understood that since adjustments effected by the steps represented by the boxes 62 and 68 result in multiplying a parameter value (from the step represented by the box 56) by coefficients obtained from the corresponding look-up tables, the adjustment represented by the box 68 can with equal success be performed before that represented by the box 62.

The effect the selected intended fan speed exerts on a fan speed signal may be best illustrated by means of Table 3 that can be developed through the following exemplary procedure, with the starting position thereof corresponding to the step D for the purposes of Table 1.

N. The selected fan speed setting is increased to a 47.5% level. In terms of fan motor voltage, this would be 47.5×0.12 volt/%=5.7 volts. (The selected or intended fan speed of 47.5% is understood to be the total setting and not a % decrease as given in Table 1.) With the vehicle not moving, the total airflow is then measured.

P. The vehicle speed is increased to 30 mph (a half-way speed between the maximum common speed of 60 mph and 0 mph optimizing the scaling of the numbers). Measured again is the total airflow which is expected to be greater than that measured in step M. Voltage to the motor is reduced until the airflow returns to the value measured in the step M, and the voltage is measured.

Q. The ratio of how the total effect is diminished is determined by taking the original signal % (or voltage) change value from the step D and dividing it by the value obtained in the step N. For example, if the voltage measured in the step N was 5.0 volts, the decrease in fan speed signal would be 47.5%−(5.0 volts/0.12%/volt)=5.8%. The ratio would be 5.8%/20% (according to Table 1 for 30 mph)=0.29. The set of points would be 47.5% intended signal level and 29% multiplier value.

R. Then, steps A–D, N–Q are repeated for various intended signal level %, preferably with equal increments, up to 100% corresponding to the highest fan speed setting obtained by 12.0 volts applied to the fan motor 16.

The signal 70 resulting from the calculations performed during the step 62 is directed to the box 68 where the value of the signal 70 is to be multiplied by a value of a signal 72 carrying information from a Look-Up Table 3 shown below and summarizing data obtained from steps A–D, N–R described in the above.

TABLE 3

| Air delivery wanted in intended signal level, % | Fan motor voltage at 0 vehicle speed | Multiplier value, % |
| --- | --- | --- |
| 30 | Lowest fan speed setting which is 4.5 volts applied to fan motor | 100 |
| 47.5 | | 29 |
| 65 | Intermediate fan speed setting which is 9.4 volts applied to fan motor | 6 |
| 82.5 | | 1 |
| 100 | Highest fan speed setting which is 12.0 volts applied to fan motor | 0 |

The values for this last adjustment can also be defined by correlation the selected intended airflow to the minimum and maximum fan speed so that an air delivery correction is more constant for all given fan speeds. The calculation performed by the controller 20 is ((255−Intended Fan Air Delivery at 0 speed)/(255−Minimum Fan Speed))×Look-Up Table Compensation. In this case discussed below in more detail, the minimum fan speed is 77, and the number 255 represents the maximum fan speed. The final fan speed is a function of the vehicle speed and an original intended fan speed (given at 0 mph and the minimum climate control unit door restriction).

The more constant air delivery correction mentioned in the above means that a given intended air delivery level setting (scaled 0–255 or 0–100%) will result by calculation in more consistent airflow volume out of the climate control unit air outlets in ft/min regardless of changes in the climate control unit air door position (which changes airflow restriction) or vehicle speed (which increases the air pressure at the climate control air inlet increasing airflow).

It should be appreciated by those skilled in the art that numbers 0, 77, and 255 are the illustrative numbers scaled in a computer accommodating the controller 20 that controls a speed of the climate control system 10 fan motor 16. The value 0 corresponds to no airflow out of the climate control ductwork. The value 255 for an 8-bit computer represents the highest number (2–1 counting from 0) and also represents the maximum airflow volume possible with full vehicle electrical power applied. Another way to express this is to attribute 255 to full air flow, or 100%, and 0 to no air flow, or 0%. The value 77 is proportionally a speed between these points and could be thought of a scaled speed of 77/255 or 30%. The use of the computer of the mentioned type is not pertinent to the description of this feature of the invention. In principle, any scaled numbers can be used to establish the proportion. The numbers used are given as an example for the system the physical computer uses to process data in a production vehicle.

Summarizing the above discussions, it may be pointed out that the first calculation based on the look-up information from Table 1 defines the decrease in fan speed, %, depending on vehicle speed. This value is then multiplied by factors derived from the other two tables (unit door position and intended fan speed selection) to reduce the amount of the original voltage reduction. The following two calculations are given for example.

Intended fan setting=30%, vehicle speed=30 mph, and the temperature door position is 0% at full cold. The result is 30%–(20% from Table 1 at 30 mph×100% from Table 2 at the temperature door 0% position×100% from Table 3 at the 30% intended fan speed level)=30%–20%=10%=10×0.12 volt/%=1.2 volts applies to the fan motor 16.

Intended fan setting=65%, vehicle speed=40 mph, and the temperature door position is 50% at half setting. The result would be 65%–(50% from Table 1 at 40 mph×57% from Table 2 at the 50% temperature door position×60% from Table 3 at the 65% intended fan speed level)=65%–(50%× 0.57×0.6)=65%–17.1%=47.9%=47.9×0.12 volt/%=5.7 volts applies to the fan motor 16.

A mode door adjustment can also be used, and a table for the mode door 40 can also be developed by setting the temperature door 38 to the full cold position and moving the mode door 40 which determines where air is expelled. Typically, the mode door panel outlet air delivery position is the least restrictive compared to the floor or defroster outlets (the outlets are not shown in Figures). The procedure of developing Table 4 is the same as for the temperature door except that the mode door is moved and the temperature door is fixed in the full cold position. An example of this table would be:

TABLE 4

| Mode door position, % | Function | Multiplier value, % |
|---|---|---|
| 0 | Panel Airflow | 100 |
| 25 | Floor and Panel Airflow | 86 |
| 50 | Floor Airflow | 72 |
| 75 | Floor and Defroster Airflow | 59 |
| 100 | Defroster Airflow | 45 |

One unit door positions and multiplier value table can be used if all climate unit doors motions are linked together. If doors operate independently such as the mode and the temperature doors, then separate tables are needed to establish a multiplying factor. In the case of separate doors, the lowest value of the multiplying factor is used in the calculation, and the other is ignored. For example, if the temperature door table multiplying factor is 28% (75% temperature door position) and the mode door multiplying factor is 72% (50% mode door position), then the 28% factor is used in the calculation, and the 72% factor is ignored. This is because the door causing the greatest air restriction sets the airflow value.

Referring back to FIGS. 1 and 3, the result 74 of the calculations will give a number which will range from 0 to 255. The signal corresponding to the number is supplied by the controller 20 to the power module 18 that varies a voltage applied to the fan motor 16. The calculated value 74 from the controller 20 is used to set the duty cycle of a square wave pulse signal. This signal is supplied to the input of the fan motor power module 18 in the form of a series of pulses. In turn, the module 18 supplies a voltage to the climate control fan motor 16 which voltage is thus proportional to the calculated number. That is, 0 would be considered 0 volts applied and 255 would be considered full voltage applied. The speed of the motor will increase as the applied voltage increases raising the fan impeller speed and increasing the air delivery to the passenger compartment. The number 77 corresponds to 30% of full air delivery. This level is subjectively found to satisfy the circulation needs of customers without notable fan noise in mild weather conditions. The opinion was obtained by asking a large group of people what they prefer for the minimum fan speed setting. Lower voltages without air inlet pressure to keep the fan motor running at a certain RPM, and correspondingly, a too low fan speed can lower fan (blower) motor life and not sufficiently distribute air. A minimum fan speed setting that is too high will provide too much noise or airflow and not subjectively satisfy the driver. The 30% value tends to supply a subjectively detectable volume of air without fan noise which in terms of blower motor voltage is approximately 4.5 volts for a nominal 12.0 volt automotive system. Changing of the voltage results in changing the fan motor power and the speed of the fan 14. According to the above discussion, the changing speed of the fan 14 keeps the volume of airflow delivery constant.

Figure 4:
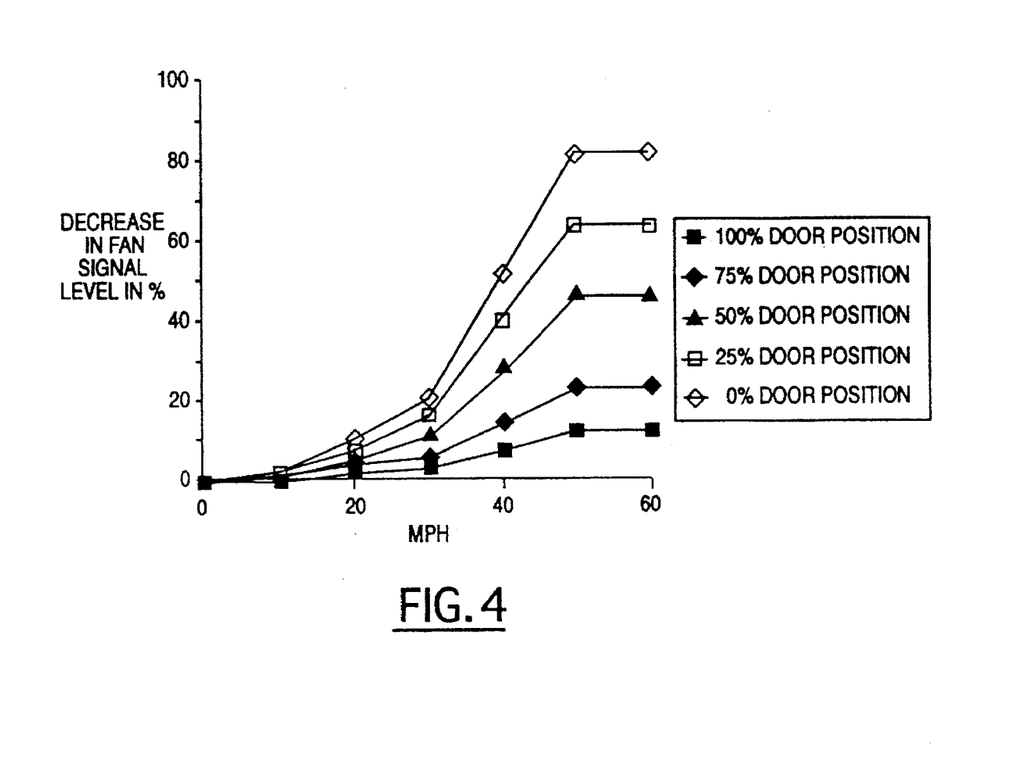
FIG. 4 is a graph illustrating one aspect of climate control airflow speed compensation provided by the system of the present invention.

Speed compensation with varying unit door position at the 30% fan setting is plotted in FIG. 4 in the form of a relationship between vehicle speed and the percentage in decrease of a fan signal level at different door positions. Based on this graph and given below as Table 5 is an example of interaction of data from vehicle speed adjustment Table 1 and calculation of climate control unit doors moving for one intended airflow setting of lowest selected fan speed of 30%.

TABLE 5

| | Decrease in Fan Speed Signal | Multiplier Value, %, for Each Door setting, % | | | | |
|---|---|---|---|---|---|---|
| MPH | from Table 1, % | 14 | 28 | 57 | 78.5 | 100 |
| 0 | 0 | 0.0 | 0.0 | 0.0 | 0.0 | 0.0 |
| 10 | 2 | 0.3 | 0.6 | 1.1 | 1.6 | 2.0 |
| 20 | 10 | 1.4 | 2.8 | 5.7 | 7.8 | 10.0 |
| 30 | 20 | 2.8 | 5.6 | 11.4 | 15.7 | 20.0 |
| 40 | 50 | 7.0 | 14.0 | 28.5 | 39.3 | 50.0 |
| 50 | 80 | 11.2 | 22.4 | 45.6 | 62.8 | 80.0 |
| 60 | 80 | 11.2 | 22.4 | 45.6 | 62.8 | 80.0 |

Table 6 is another example of interaction of vehicle speed adjustment and calculation of climate control unit doors moving for another intended airflow setting of selected fan speed of 67%.

TABLE 6

| MPH | Decrease in Fan Speed Signal for Setting of 67% | Multiplier Value, %, for Each Door setting, % | | | | |
|---|---|---|---|---|---|---|
| | | 14 | 28 | 57 | 78.5 | 100 |
| 0 | 0 | 0.0 | 0.0 | 0.0 | 0.0 | 0.0 |
| 10 | 0.8 | 0.1 | 0.2 | 0.5 | 0.6 | 0.8 |
| 20 | 4.0 | 0.6 | 1.1 | 2.3 | 3.1 | 4.0 |
| 30 | 7.9 | 1.1 | 2.2 | 4.5 | 6.2 | 7.9 |
| 40 | 19.8 | 2.8 | 5.6 | 11.3 | 15.6 | 19.8 |
| 50 | 31.7 | 4.4 | 8.9 | 18.1 | 24.9 | 31.7 |
| 60 | 31.7 | 4.4 | 8.9 | 18.1 | 24.9 | 31.7 |

Figure 5:
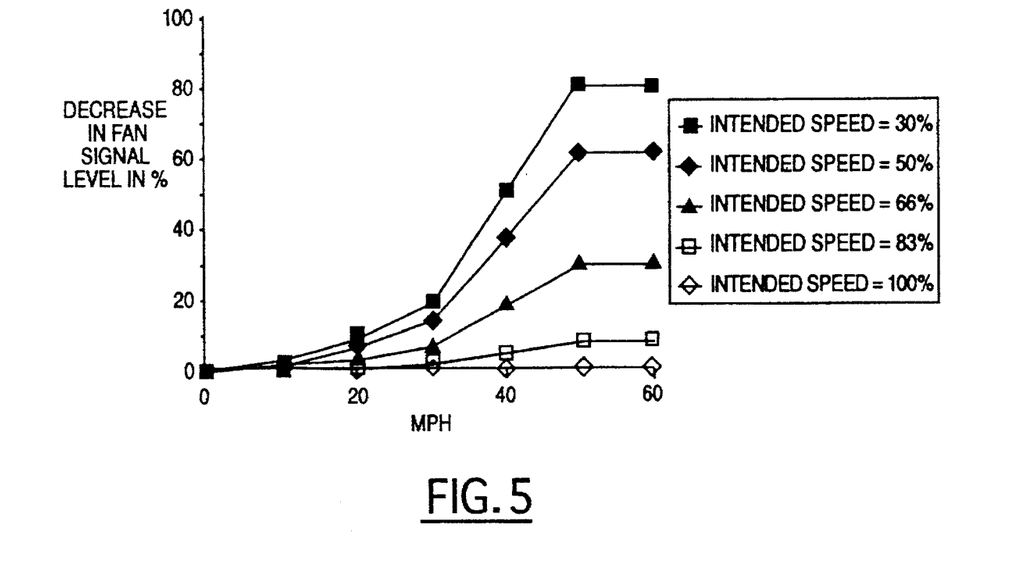
FIG. 5 is a graph illustrating another aspect of climate control airflow speed compensation provided by the system of the present invention.

Speed compensation with fixed climate control unit door position is plotted in FIG. 5 in the form of a relationship between vehicle speed and the percentage in decrease of a fan signal level at different values of an intended fan speed.

Table 7 is based on this relationship and given as an example of interaction of vehicle speed adjustment data from Table 1 and calculation of intended airflow for climate control unit doors fixed in the full cold outside air intake position discharged from the panel.

TABLE 7

| MPH | Decrease in Fan Speed Signal, % | Intended Fan Speed | | | | |
|---|---|---|---|---|---|---|
| | | 30 | 47 | 64 | 80 | 97 |
| 0 | 0 | 0.0 | 0.0 | 0.0 | 0.0 | 0.0 |
| 10 | 2 | 2.0 | 1.5 | 0.8 | 0.2 | 0.0 |
| 20 | 10 | 10.0 | 7.6 | 4.0 | 1.1 | 0.0 |
| 30 | 20 | 20.0 | 15.2 | 7.9 | 2.2 | 0.1 |
| 40 | 50 | 50.0 | 38.0 | 19.8 | 5.6 | 0.2 |
| 50 | 80 | 80.0 | 60.9 | 31.7 | 9.0 | 0.4 |
| 60 | 80 | 80.0 | 60.9 | 31.7 | 9.0 | 0.4 |

The foregoing detailed description shows that the preferred embodiment of the present invention is well suited for the fulfillment of the objects of the invention. Although the present invention has been described with a specific reference to a typical application thereof, it is to be clearly recognized that the same is by way of illustration and example only, and is not to be taken by way of limitation. Those versed in the art may make various changes, modifications or additions which the preferred embodiment chosen here to illustrate the present invention is susceptible of, without departing from the spirit and scope of the present invention. Accordingly, it is to be understood that the subject matter sought to be afforded protection thereby should be deemed to extend to the subject matter as set forth in the appended claims, including all fair equivalents thereof.

What is claimed is:

1. A vehicle climate control system comprising:

a fan for forcing air into a passenger compartment of said vehicle, an electric motor driving said fan, a power module operating said motor, a plurality of sensors perceiving respective perturbing factors influencing a climate in said vehicle, including a vehicle speed sensor, an airflow setting sensor, a climate control unit temperature sensor, and air distribution door position sensors, and a controller comprising a memory unit, sensors of said plurality of sensors being connected to said controller to provide the same with respective data for correlation said data to look-up table values stored in said memory unit of said controller, said controller being connected to said power module, to provide the same with a signal resulting from said correlation and to cause a power module output voltage applied to said electric motor to be regulated, to thereby keep a speed of rotation of said fan regulated to keep a volume of airflow supplied from said fan to said passenger compartment invariant to said respective perturbing factors.

2. The vehicle climate control system according to claim 1, wherein said air distribution door position sensors include a recirculation door position sensor, a mode door position sensor, and a temperature door sensor.

3. A method of maintaining a preselected regime in a vehicle climate control system having an inlet duct for taking ambient air, a means for temperature affecting a flow of said ambient air, means for distributing the same into a passenger compartment of said vehicle by virtue of a fan driven by a motor, and a means controlling said regime and affecting a voltage applied to said motor, said method comprising the steps of:

(a) sensing data characterizing a speed of said vehicle;

(b) sensing data characterizing a selected level of delivery of said ambient airflow into said passenger compartment;

(c) sensing data characterizing status of said temperature affecting means and said distributing means;

(d) defining data characterizing relationship between said speed of said vehicle and a speed of said fan;

(e) storing in said controlling means said data defined in step (d);

(f) defining data characterizing the extent to which said speed of said fan is affected by said status of said temperature affecting means;

(g) storing in said controlling means said data defined in step (f);

(h) defining data characterizing the extent to which said speed of said fan is affected by an amount of wanted air delivery into said passenger compartment;

(i) storing in said controlling means said data defined in step (h); and (j) correlating said sensed data to said stored data to generate a signal maintaining a substantially constant airflow volume supplied to said passenger compartment and decreasing said voltage when said speed of said vehicle increases.

4. The method of maintaining a preselected regime in a vehicle climate control system according to claim 3, wherein said step (d) of defining data characterizing relationship between said speed of said vehicle and a speed of said fan comprises substitutability of:

(da) setting said fan to a lowest speed;

(db) setting a least restrictive path of said ambient airflow;

(dc) measuring said voltage applied to said fan motor;

(dd) measuring a level of said airflow volume out of said distributing means, with an outside wind speed less than 5 mph and said vehicle not moving;

(de) increasing speed of said vehicle by a first predetermined amount, said speed increasing resulting in an airflow volume changing;

(df) measuring said changed airflow volume;

(dg) decreasing said voltage and measuring the same at a level of said airflow volume returned from that measured in substep (df) to that measured in substep (dd); and (dh) successive repeating substep (de), with substep (df) airflow volume measuring and substep (dg) voltage decreasing and measuring being performed for each said repeating until said voltage is 0 volts.

5. The method of maintaining a preselected regime in a vehicle climate control system according to claim 4, wherein said lowest speed fan setting is 30% of a maximum value thereof.

6. The method of maintaining a preselected regime in a vehicle climate control system according to claim 4, wherein said first predetermined amount is 10 mph.

7. The method of maintaining a preselected regime in a vehicle climate control system according to claim 3, wherein said step (f) of defining data characterizing the extent to which said speed of said fan is affected by said status of said temperature affecting means comprises substeps of:

(fa) setting said fan to a lowest speed;

(fb) setting a least restrictive path of said ambient airflow;

(fc) measuring said voltage applied to said fan motor;

(fd) measuring a level of said airflow volume out of said distributing means, with an outside wind speed less than 5 mph and said vehicle not moving;

(fe) increasing speed of said vehicle by a second predetermined amount, said speed increasing resulting in an airflow volume changing;

(ff) measuring said changed airflow volume;

(fg) moving said temperature affecting means to a full heat position, Said moving resulting in an airflow volume decreasing; and (fh) increasing said voltage and measuring the same at a level producing said changed airflow volume measured in substep (ff).

(fi) moving said temperature affecting means to a plurality of intermediate states, preferably spaced equidistantly from each other; and (fj) changing said voltage and measuring the same for each of said plurality of intermediate states at said level producing said changed airflow volume measured in substep (ff).

8. The method of maintaining a preselected regime in a vehicle climate control system according to claim 7, wherein said lowest speed fan setting is 30% of a maximum value thereof.

9. The method of maintaining a preselected regime in a vehicle climate control system according to claim 7, wherein said second predetermined amount is 30 mph.

10. The method of maintaining a preselected regime in a vehicle climate control system according to claim 3, wherein said step (h) of defining data characterizing the extent to which said speed of said fan is affected by said amount of wanted air delivery into said passenger compartment comprises substeps of:

(ha) setting said fan to a lowest speed;

(hb) setting a least restrictive path of said ambient airflow;

(hc) measuring said voltage applied to said fan motor;

(hd) measuring a level of said airflow volume out of said distributing means, with an outside wind speed less than 5 mph and said vehicle not moving;

(he) increasing said fan speed setting by a third predetermined amount, said fan speed setting increasing resulting in a first airflow volume changing;

(hf) measuring said firstly changed airflow volume;

(hg) increasing said speed of said vehicle to a fourth predetermined amount, said speed increasing resulting in a second airflow volume changing;

(hh) measuring said secondly changed airflow volume;

(hi) decreasing said voltage and measuring the same at a level producing said firstly changed airflow level measured in substep (hd); and (hj) repeating substeps (he)–(hi) successively increasing said fan speed setting.

11. The method of maintaining a preselected regime in a vehicle climate control system according to claim 10, wherein said lowest speed fan setting is 30% of a maximum value thereof.

12. The method of maintaining a preselected regime in a vehicle climate control system according to claim 10, wherein said third predetermined amount is 17.5%.

13. The method of maintaining a preselected regime in a vehicle climate control system according to claim 10, wherein said fourth predetermined amount is 30 mph.

* * * * *